FIG. 1

INVENTORS.
STANLEY W. COGAN
JOSEPH C. BOLTINGHOUSE
BY
AGENT

INVENTORS.
STANLEY W. COGAN
JOSEPH C. BOLTINGHOUSE
BY

AGENT

United States Patent Office 2,925,590
Patented Feb. 16, 1960

2,925,590
CAPACITIVE PICKOFF

Joseph C. Boltinghouse and Stanley W. Cogan, Whittier, Calif., assignors to North American Aviation, Inc.

Application August 1, 1957, Serial No. 675,663

18 Claims. (Cl. 340—200)

This invention relates to capacitive pickoffs and more particularly to a capacitive pickoff which can be utilized to determine the relative position between two relatively moving members.

Capacitive pickoff devices are often utilized to determine the relative position between two members. In most cases, this is accomplished by measuring the difference in capacitance between each of two pickoff plates mounted on one member and the other member either in a bridge circuit or by feeding an alternating current signal to each such plate through independent circuitry and then determining the difference between the signals generated through each pickoff plate.

Such a device is often used in the pickoff circuitry utilized with a gyroscope to obtain orientation and stabilization of airborne navigational equipment. It is well-suited to such a purpose because of its compactness, simplicity, and because it imposes negligible torques on the rotor of the gyroscope. It does have a disadvantage, however, in that there tends to be a drift from the predetermined electrical null position giving an erroneous correction signal. This drift is generally caused by capacitance changes in circuitry external to the pickoffs.

Small changes of capacitance in transformer windings with temperature changes and such changes due to physical motion of the wiring are difficult or impossible to eliminate. This problem is effectively minimized through this invention. This is because the alternating current signals utilized are generated right at the pickoff plates themselves and the plates are connected to the associated circuitry in parallel. Consequently, any changes in capacitance are equally added to that at both plates. As the signals generated by each of the plates are 180° out of phase with each other and the difference signal alone is utilized, changing capacitance common to both these plates has little or no effect on the output signal.

The device of this invention utilizes a pair of pickoff plates situated in close proximity to a member having a plurality of capacitive means located proximate to the pickoff plates. Such means can be provided in several ways such as, for example, by teeth, projections, or apertures. The pickoff plates are located capacitively 180° out of phase with respect to each other; i.e., when one pickoff plate and a reference plate is positioned directly opposite a tooth or space between apertures, the other is positioned directly opposite an aperture or a space between teeth. The capacitances between the capacitive means and each of the pickoff plates are compared. A direct current is fed through an output impedance in the form of a transformer winding to both pickoff plates connected in parallel. A direct current is also fed to the reference plate through a winding of a separate transformer. A fluctuating current is generated from each plate through the transformer when there is relative motion between the members. The signals generated at the pickoff plates are of mutually opposite phase. If one plate is closer to the member having the capacitive means than the other plate, there will be a greater maximum capacitance between it and this member, and therefore a higher amplitude fluctuating signal will be generated through this plate. The signals generated at the plates are algebraically summed, and a combined signal results which has an instantaneous phase and magnitude indicative of the difference in distance between each of the pickoff plates and the member having the capacitive means. Changes in capacitance in the external circuitry will not change the difference between the signals generated through one plate and its paired plate. In this manner, drift is minimized. Experimentation indicates that as much as 12 times greater accuracy of stabilization can be achieved with the device of this invention than a device utilizing an external reference signal connected in conventional fashion.

It is therefore an object of this invention to provide an improved capacitive pickoff.

It is a further object of this invention to provide a capacitive pickoff which is less subject to drift than similar devices.

It is a still further object of this inventon to improve the performance of space stabilization devices.

It is still another object of this invention to permit greater accuracy of operation of a stabilizing gyroscope.

It is a still further object of this invention to provide a simple, more accurate means for generating a signal for maintaining a relative position between two members.

It is still another object of this invention to provide a unique means for generating a fluctuating current signal from a direct current input.

Other objects of this invention will become apparent from the following description taken in connection with the accompanying drawings in which.

Figure 1:
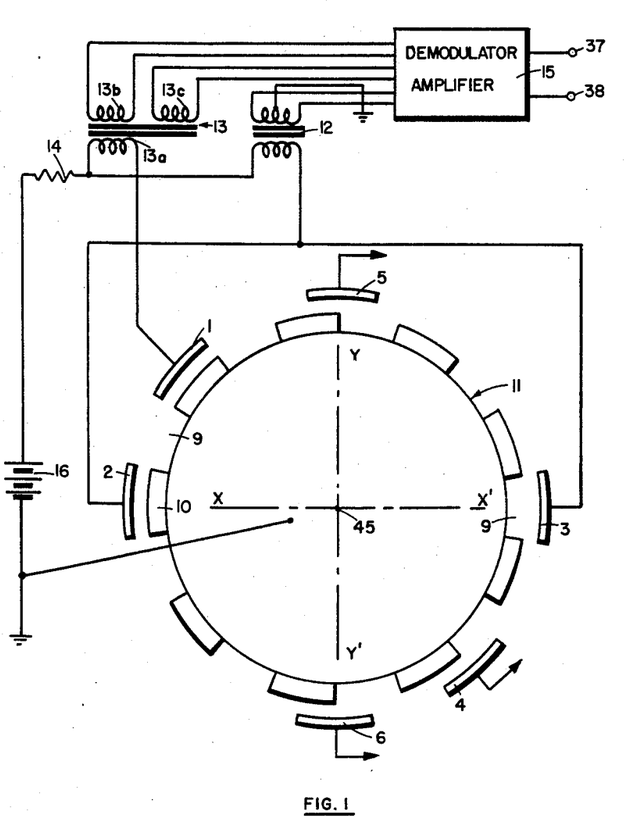
Fig. 1 is a schematic diagram of the invention.
Figure 11:
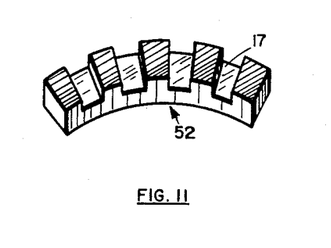
Fig. 11 is an isometric view of a single pickoff plate of the embodiment illustrated in Figs. 6 and 8.

Referring to Fig. 1, which is a schematic diagram of the invention, rotatable member 11 having an odd number of capacitive means in the form of teeth 10 therein is rotatably driven about axis 45 by any suitable means (not shown) with reference to a fixed member (not shown). Fixedly mounted on this fixed member are electrically conductive pickoff plate pairs 2, 3 and 5, 6. These pickoff plates are electrically insulated from the fixed member. For greater pickoff sensitivity, the pickoff plates, as will be explained later, can be elongated notched elements as illustrated in Fig. 11. Reference plates 1 and 4 are similarly fixedly mounted on the fixed member and insulated therefrom and they too must be made of a suitable electrically conductive material. The teeth 10 are electrically connected to B minus of direct current power source 16 (as illustrated here through electrically conductive rotor 11). It is not essential, however, that the rotor be electrically conductive so long as the teeth are conductive and there are means provided for making a common B minus connection to all the teeth.

Paired pickoff plates 2 and 3 are positioned opposite each other and so that when one is opposite a tooth 10 on the rotating member the other is opposite a space 9 between adjacent teeth. These opposite pickoff plates 2 and 3 are electrically connected together and this common connection is connected to one end of the primary winding of pickoff transformer 12. The other end of this pickoff transformer winding is connected through current limiting resistor 14 to the positive terminal of direct current power source 16.

Reference plate 1 is electrically connected to one end of the primary winding of reference transformer 13. The other end of the primary of this transformer is connected to the positive terminal of power source 16 through resistor 14. Transformer 13 has two secondaries, 13c and 13b, both of which are fed to a phase-sensitive demodulator 15. The secondary winding of pick-off transformer 12 is similarly fed to the phase-sensitive demodulator. The center tap of this transformer winding is fed to the B minus terminal of power source 16 which may be grounded.

Figure 2:
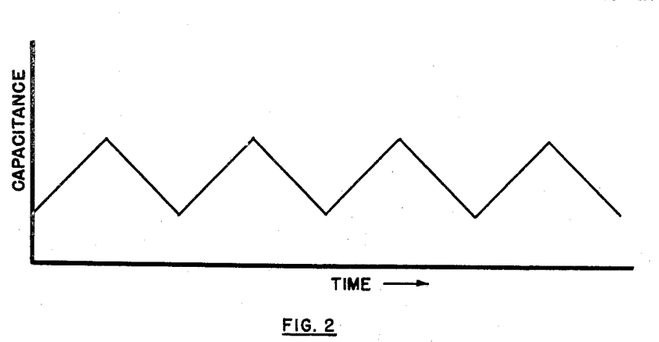
Fig. 2 illustrates variations of capacitance of a pickoff or reference plate.

Fig. 2 illustrates the variation in the capacitance between a single pickoff plate of Fig. 1 such as plate 2 for example, and the capacitative means of rotating member 11 when this member is rotating at a constant speed. As can be seen, capacitance increases and decreases between maximum and minimum values in the form of a saw tooth. Basic electrical theory establishes the relationship $Q = CE$ where Q is the charge on the capacitor, C is the capacitance and E is the voltage applied across the capacitor formed by plate 2 and the capacitative means. With a direct current source connected between a pickoff plate and the rotor, the charge between this plate and the capacitative means of the rotating member will vary in accordance with variations in capacitance between the two. The applied voltage E is the voltage of the power source 16 less the voltage drops across resistor 14 and the primary of transformer 12. These voltage drops vary as a function of the current flow through these components. The current flow I to the capacitor is equal to $$\frac{dQ}{dt}$$

or by substitution $$\frac{d(CE)}{dt}$$

With C increasing and decreasing linearly, if E were similarly changing linearly, $$\frac{dQ}{dt}$$

would be a constant current which is in one direction when C and Q are increasing and in the opposite direction when they are decreasing. The magnitude of this current is a direct function of the difference between the maximum and minimum charges on the capacitor which in turn is a function of the difference between maximum and minimum capacitance. E, however, does not vary linearly due to the reactance and resistance contributed to the circuit primarily by resistor 14, the primary of transformer 12 and the capacitance in the charging circuit. This modifies what theoretically would be an alternating square wave of current flow in the circuit to a somewhat rounded square wave which approaches a sine wave. The maximum value of this wave remains proportional to the difference between maximum and minimum capacitance. This alternating current flows through the primary of transformer 12. The net capacitance change between the pickoff plates and the rotating member therefore will generate an output signal represented by an alternating current in the primary winding of this transformer.

Due to the positioning of the pickoff plates with one opposite a tooth while the other is opposite a space between teeth, one will be at a maximum capacitance when the other is at a minimum, and the alternating currents generated by each will be 180° out of phase with each other.

Figure 3:
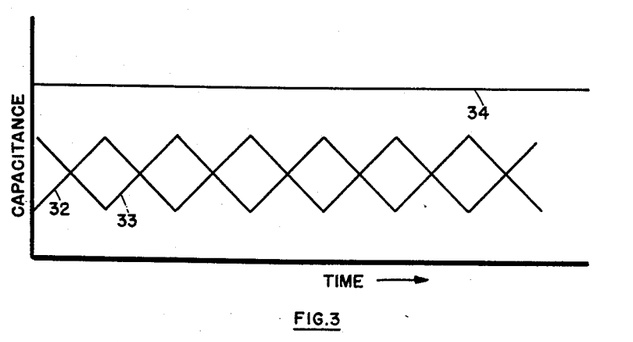
Fig. 3 illustrates the variations of capacitance of two cooperating pickoff plates when the two members are at a relative null position.

Referring to Fig. 3, variations of capacitance between pickoff plate 2 and pickoff plate 3 of an opposite pair as shown in Fig. 1 and the capacitive means of the rotating member are illustrated. In this instance, the pickoff plates are equidistant from the rotating member, and the maximum and minimum capacitances shown for plate 2 by curve 32 are identical with those for pickoff plate 3 shown by curve 33. As previously explained, these variations of capacitance will be 180° out of phase with each other. Under these conditions of identical maximum and minimum values of capacitance, the sum total of capacitances will be constant as shown by curve 34. If the total capacitance remains constant, there will be no variations in the current flow in a series electrical circuit and consequently no output current will be generated in the primary winding of pickoff transformer 12 (Fig. 1). There will consequently be no signal input from the pickoff transformer to the phase sensitive demodulator 15.

Figure 4:
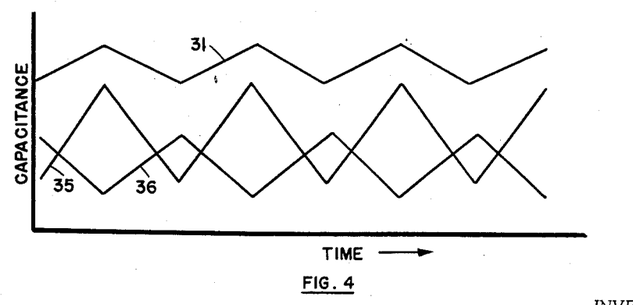
Fig. 4 illustrates the variations of capacitance of two cooperating pickoff plates with the members displaced from a relative null position.

Referring to Fig. 4, capacitance variations between each of the pickoff plates and the capacitative means of the rotating member are again illustrated. But, in this case, pickoff plate 2 is spaced closer to the rotating member than is pickoff plate 3. This change in relative spacing may be produced, for example, by relative translational or pivotal motion between the rotor and the structure carrying the pickoff plates. As illustrated in Fig. 1, for example, such relative motion may be in the direction $x'—x$ and comprise the motion which is to be manifested as an electrical signal. The maximum capacitance between plate 2 and rotor 11 as illustrated by curve 35 will be greater than the maximum capacitance between pickoff plate 3 and the rotating member as illustrated by curve 36. The sum of the two capacitances illustrated by curve 31 is in phase with the capacitance variation between plate 2 and the rotating member and is equal to the difference in capacitances between that of plate 2 and plate 3 and the rotating member.

The reference plate can be chosen to give capacitance variations either in phase with those of plate 2 or plate 3. Referring again to Fig. 1, the reference plate 1 is shown in phase with pickoff plate 2. The output signal of the phase-sensitive demodulator 15 will depend in polarity on which of the pickoff plates the reference plate is chosen to be in phase with and this can be selected to meet design considerations. The difference signal produced through the capacitance variation of curve 31 in Fig. 4 is fed through transformer 12 (Fig. 1) as an alternating current signal which is proportional to this capacitance variation into phase-sensitive demodulator 15. The reference signal which is similarly an alternating current is fed through reference transformer 13 to the demodulator. As indicated in Fig. 1, reference transformer 13 has two secondary windings. The functions of these two windings will be explained with the description of the phase-sensitive demodulator to follow.

It is to be noted that while only one pair of pickoff plates and a single reference plate have been described for illustrative purposes, there may be additional such pairs and reference plates to give output signals indicative of relative motion along or about other axes such as $y—y'$ indicated in Fig. 1. Such an additional pair of pickoff plates and a reference plate are shown in Fig. 1, the pickoff plates being 5 and 6 and the reference plate 4. These plates can be connected in separate identical circuitry (not shown) as that shown for plates 1, 2, and 3 to give a signal for a second axis, y—y'.

Figure 5:
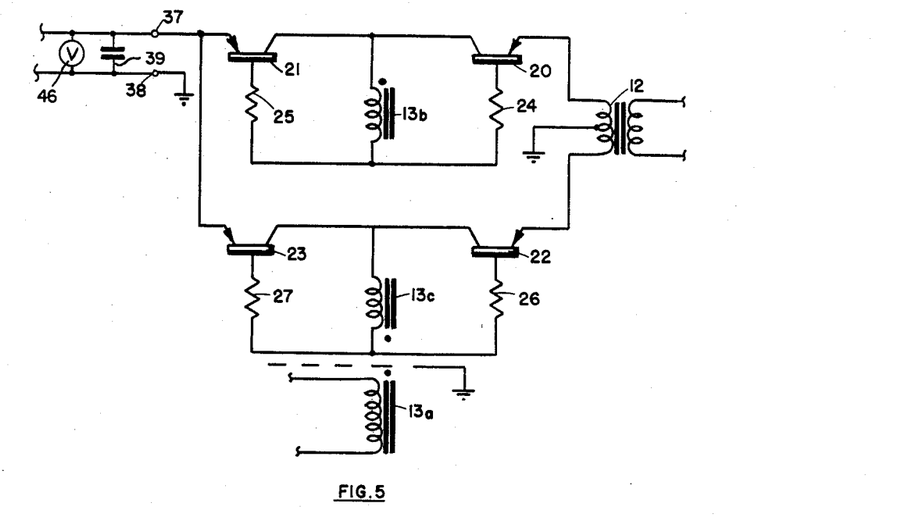
Fig. 5 is a schematic diagram of a phase-sensitive demodulator which can be used with the device of this invention.

Referring to Fig. 5, a phase-sensitive demodulator which can be utilized with this invention is shown in schematic form. The basic concepts of this circuit are described in detail in an article entitled "Junction Transistors Used as Switches," by R. L. Bright, which appeared in Electrical Engineering (AIEE) for March 1955, pp. 111–121 (see pages 119–121 particularly). The signal from the pickoff plates is fed into the primary of pickoff transformer 12. The secondary of this transformer has a grounded center tap to give balanced operation. The top of the secondary winding of this transformer is fed to the emitter electrode of transistor 20. The collector electrode of this transistor is commonly connected to one end of one of the secondary windings 13b of reference transformer 13, and the collector electrode of a second transistor 21. The bases of transistors 20 and 21 are respectively connected to separate current-limiting resistors 24 and 25. The other ends of both of these resistors are commonly connected to the other side of the secondary winding 13b of the reference transformer. The emitter electrode of transistor 21 is connected to output terminal 37.

The bottom end of the secondary of pickoff transformer 12 is connected to the emitter electrode of a third transistor 22. This transistor is connected in similar circuitry as that described for transistors 21 and 22 to a fourth transistor 23. Transistors 22 and 23 have current limiting resistors 26 and 27 connected from their bases to one end of the secondary 13c of reference transformer 13. The secondary 13c of reference transformer 13 is connected to transistors 22 and 23 in the same way that secondary 13b is connected to transistors 20 and 21 with one exception— that is the polarity of the voltage fed to the collectors of transistors 20 and 21 from secondary 13b is 180° out of phase with that fed to the collectors of transistors 22 and 23 by secondary 13c. The reference voltage from the reference plate is fed to the primary winding 13a of reference transformer 13.

The phase-sensitive demodulator illustrated in Fig. 5 operates essentially as two pairs of transistor switches. The reference voltage is applied from winding 13b between the bases and collectors of P–N–P type transistors 20 and 21. When this voltage negatively biases the bases with respect to the collectors, it will allow both of these transistors to conduct. When it positively biases the bases of these transistors with respect to their collectors, it will keep at least one of the transistors cut off. The reference voltage fed between the collectors and bases of transistors 20 and 21 is 180° out of phase with the voltage fed between the bases and collectors of transistors 22 and 23. This is provided for by appropriately connecting the secondaries 13b and 13c of reference transformer 13. Consequently, transistors 20 and 21 will conduct during the alternate half cycle when the path through transistors 22 and 23 is cut off and transistors 22 and 23 will conduct while the path through 20 and 21 is cut off.

Assuming a pickoff signal fed in through pickoff transformer 12 to the emitter of transistor 20 arriving in phase with the reference voltage applied to the collector of transistor 20, during the positive half cycle of reference and pickoff voltages, both transistors 20 and 21 will conduct. This will give a positive output signal between points 37 and 38 across which a suitable load (not shown) is connected. During the negative half cycle of the reference and pickoff signals, transistor 20 may conduct but transistor 21 will be cut off and there will be no output signal between points 37 and 38. It is to be noted that the conduction path is from the input transformer 12 through both transistors such as 20, 21 in series circuit to the load, one transistor conducting in its normal direction while the other conducts inversely. Such transistors as the G–E type 2N43 or the Raytheon type 2N64 will function satisfactorily in such a circuit.

Looking now at what is occurring at transistors 22 and 23, during the first half cycle, at least transistor 23 is cut off because the reference voltage is negative-going. Consequently during this time there will be no output signal between points 37 and 38. During the second half cycle both transistors will conduct to give a positive output signal.

The resultant output, therefore (combining the outputs of both currents paths) will be two positive-going rounded square waves (with capacitor 39 disconnected). The amplitude of these waves will be directly proportional to the input signal. When integrated across a capacitance such as capacitor 39 or other integrating device, a direct current signal will result. Such a direct current signal which may be read on a positive and negative reading voltmeter 46 can be used as desired to operate a servo system or for any suitable purpose application demands may dictate.

It is to be noted that this direct current output signal is directly proportional in magnitude and polarity to the magnitude and sense of the difference in distance between the paired pickoff plates and the rotating member. If the pickoff signal were 180° out of phase with the reference signal, both transistors would only be allowed to conduct when there was a positive reference signal at their collectors and a negative pickoff signal at their emitters. Consequently, we would end up with negative-going rounded square waves between output terminals 37 and 38 (with capacitor 39 disconnected). When integrated by capacitor 39, these would give a direct current signal of negative polarity proportional in amplitude to the difference in distance between the pickoff plates and the rotating member. Whether the pickoff signal is in phase or 180° out of phase with the reference signal and the polarity of the output signal depend on which of the paired pickoff plates is closer to the rotating member.

The demodulator shown in Fig. 5 is only one means of achieving a direct current output signal proportional in magnitude and polarity to a pickoff signal. Other suitable means may be utilized to convert the pickoff signal to this or any other form as application demands may dictate.

Figure 6:
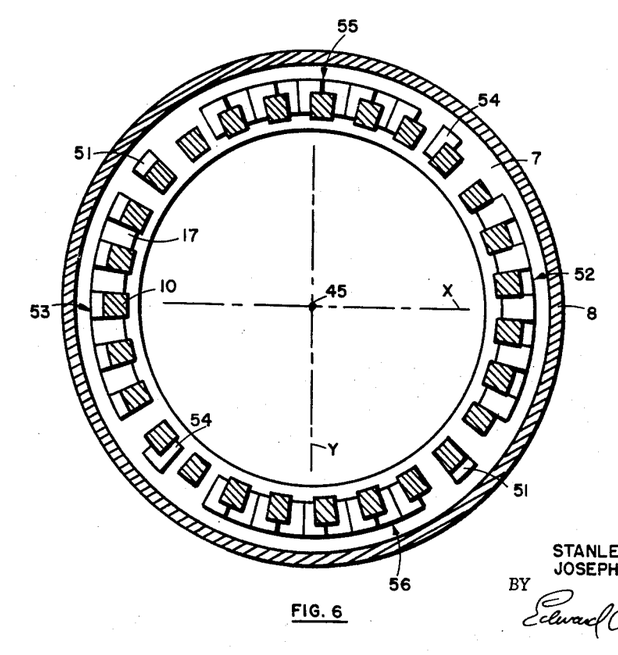
Fig. 6 is a cross-sectional view on line 6—6 of Fig. 8 of a first embodiment of the invention.
Figure 8:
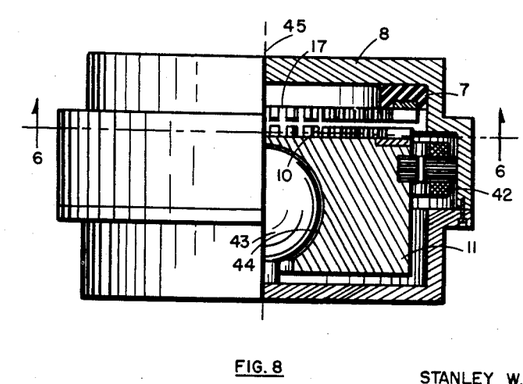
Fig. 8 is an elevation view of a first embodiment of the invention with parts broken away.

Referring to Figs. 6, 8, and 11, the invention is shown as incorporated into a gas bearing gyro having a rotor 11 supported by air bearing 44 between this rotating member and a fixed center ball 43. Electrically energized field windings 42 generate eddy currents in rotor 11 and this rotor is driven in conventional fashion about axis 45. It is to be noted that while the schematic illustration of Fig. 1 shows the plates 1–6 to be displaced radially of the rotor and thus best sense relative translational motion in radial dirctions, in the illustrated gyro the pickoff plates and the capacitative means are all substantially equi-spaced in radial directions but are relatively displaced in a direction parallel to the axis of rotation of the gyro rotor. The pickoff is thus best adapted to sense pivotal motion of the rotor relative to its case about axes perpendicular to the rotor axis 45. Pickoff plates 52 and 53 insulated from and fixedly mounted on stator case 8 serve to furnish pickoff signals for relative pivotal motions about axis Y. Suitable insulating material 7 to electrically insulate the pickoff plates from this stator case must be provided. The construction of a single pickoff plate 52 is illustrated in Fig. 11. The pickoff plates have a series of notches 17 therein. These notches should also be approximately equal to the width of the rotor teeth 10. The pickoff plates, as can be seen, are elongated. The width of both pickoff plate notches and rotor teeth is herein defined as the dimension which extends circumferentially and is concentric with the axis of rotation 45 of rotating member 11.

Figure 9:
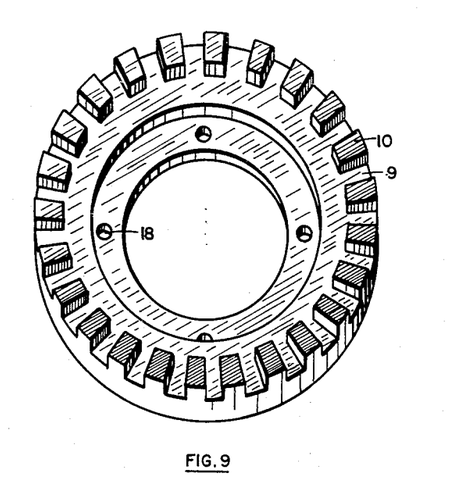
Fig. 9 is an isometric view of a rotor tooth plate which can be utilized with the embodiment illustrated in Figs. 6 and 8.

Referring to Figs. 6 and 9, rotating member 11 has an odd number of equal width teeth 10 equispaced around its periphery. These teeth are arranged to be in close proximity to the pickoff plates and should be equal in width to the space 9 between teeth. The notches in pickoff plate 52 are arranged so that they are opposite a rotor tooth when the notches on oppositely oriented pickoff plate 53 are opposite a space between teeth. Having a series of notches in each pickoff plate enables greater pickoff sensitivity by increasing the capacitive signal generating area and therefore providing a higher magnitude correction signal. The device could operate satisfactorily with unnotched plates which need be only as large as a single tooth on the rotor. Fig. 9 illustrates a rotor tooth plate on which the teeth can readily be machined and which may be attached to the rotor by machine screws located at mounting holes 18.

Two reference plates 51 are provided to operate with pickoff plates 52 and 53. They are arbitrarily shown in phase with pickoff plate 53, but could be designed to be in phase with plates 52. These reference plates are approximately the same size as the individual teeth on the rotating member. The oppositely oriented reference plates are here provided to provide a constant amplitude reference signal which will tend to be unaffected by rotor displacements producing unequal air gaps between these plates and the rotor. However, a single reference plate would be adequate where a constant reference voltage is not essential. The two plates 51 are electrically connected to the same point of winding 13a (Fig. 1).

Oppositely oriented pickoff plates 55 and 56, similar in construction to plates 52 and 53 are utilized to generate a pickoff signal for relative pivotal motion about axis X. Reference plates 54 function similarly to plates 51 to provide a reference signal for plates 55 and 56.

Figure 7:
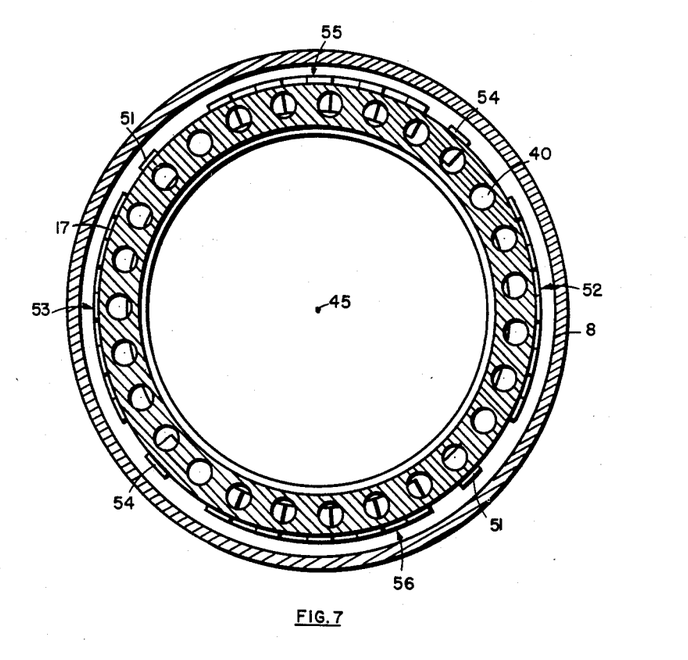
Fig. 7 is a cross-sectional view similar to that of Fig. 6 of a second embodiment of the invention.
Figure 10:
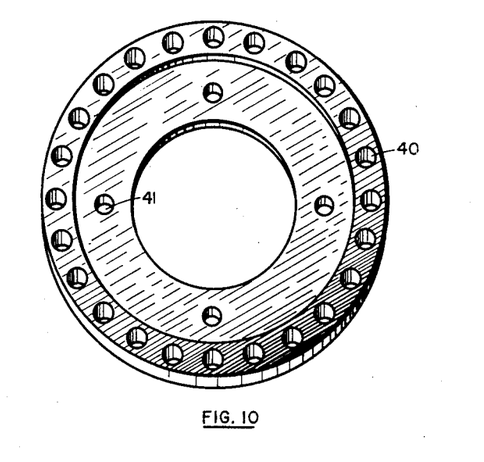
Fig. 10 is an isometric view of a rotor aperture plate which can be utilized with the embodiment illustrated in Fig. 7.

Referring now to Figs. 7 and 10, details of a second embodiment of the invention are shown. This embodiment has the advantage over that shown in Fig. 6 of easier construction and an output signal more closely resembling a sine wave. This embodiment differs from the one previously described in having as its capacitive means the areas between an odd number of apertures 40 in place of teeth on the periphery of the rotor to operate in conjunction with the pickoff plates 52 and 53 to provide a varying capacitance. The apertures 40 can be of any convenient diameter. They are preferably evenly spaced and should be approximately equal in diameter to the notches in the pickoff plates. Spaces between apertures should be equal to aperture diameter. It is essential also that when a notch 17 in one pickoff plate 52 is opposite an aperture that a notch in an oppositely paired pickoff plate 53 be opposite a space in between apertures. Reference plates 51 and 54 and pickoff plates 52, 53, 55, and 56 and reference plates 4 are identical to those described for the first embodiment. The capacitance variations in the embodiment shown in Fig. 7 will tend to increase and decrease in accordance with a sine wave as the rotating member moves relative to the pickoff plates. Such a signal can be handled with less power loss in transformers than the rounded square wave generated by the embodiment shown in Fig. 6. Fig. 10 illustrates a rotor aperture plate similar to the rotor tooth plate of Fig. 9 which can be readily attached to the rotor with machine screws located at mounting holes 41.

Although the invention has been described and illustrated in detail, it is to be clearly understood that the same is by way of illustrations and example only and is not to be taken by way of limitation, the spirit and scope of this invention being limited only by the terms of the appended claims.

We claim:
1. A capacitive pickoff comprising a first plurality of capacitive plates disposed about an axis, means for rotating said plates about said axis, a second plurality of capacitive plates located in cooperative relationship with said first plurality of capacitive plates, said second plurality of capacitive plates comprising signal pickoff plates and a reference plate for generating a direction sensing signal, and means for detecting the variation in total capacitance provided by said first plates and second plurality of capacitive signal pickoff plates.

2. The combination recited in claim 1 wherein said signal pickoff plates comprise two capacitive plates located capacitively 180° out of phase with respect to each other.

3. In a capacitive pickoff, a first member having at least one electrically conductive pickoff plate and at least one electrically conductive reference plate fixedly mounted on a surface thereof and insulated therefrom, a second member having a plurality of electrically connected capacitive means located proximate to said pickoff and reference plate mounted surface of said first member, an output impedance, a direct current power source series connected with said impedance, said pickoff plate, said reference plate and said capacitive plate means, and means for causing relative motion of one of said first and second members about an axis parallel to the plane of said pickoff and reference plate mounted surface of said first member.

4. In combination, a pair of members mounted for relative pivotal motion about each of two mutually angulated axes, means for driving one of said members about one of said axes, means responsive to said motion about said one axis for capacitatively generating a pair of mutually opposite phase electrical signals having a combined instantaneous phase and magnitude indicative of the sense nad magnitude of relative motion of said members about said second axis, means responsive to said motion about said one axis for capacitively generating a phase reference signal, means for combining said pair of mutually opposite phase signals, and means for detecting the phase of said combined signals relative to said reference signal and the magnitude of said combined signals.

5. In combination, a pair of mutually adjacent members mounted for relative motion in at least two different directions, means for driving one of said members in one of said directions, means on said members responsive to said relative motion in said one direction for capacitatively generating a pair of fluctuating signals of mutually opposite phase and each having a magnitude which varies respectively in accordance with the distance between one of said members and the other of said members, output means for combining said signals, means synchronized with the relative motion of said members for capacitively generating a reference signal, and means for indicating the phase of said combined signals relative to said reference signal.

6. A device of the class described comprising a pair of members mounted for a first relative motion, said members being mounted for a second relative motion which inversely varies each of the distances between one of said members and each of two portions of the other member, driving means for effecting said first relative motion, means including capacitive means affixed to said members and responsive to said first motion for capacitatively generating a pair of mutually opposite phase fluctuating signals each having a magnitude which varies in accordance with a respective one of said distances, means for combining said signals, means synchronized with the relative motion of said members for capacitively generating a reference signal, and means for producing an output signal indicative of the phase relationship between said combined signals and said reference signal and the magnitude of said combined signals.

7. A capacitive pickoff device comprising at least two electrically conductive pickoff plates and one electrically conductive reference plate, a member having a plurality of electrically connected mutually spaced capacitive means located proximate to said reference and pickoff plates, means for causing relative motion between said plates and said member, said reference plate and one of said pickoff plates being positioned directly opposite one of said capacitive means when the other of said pickoff plates is positioned directly opposite a space between adjacent capacitive means, and means for detecting the difference in capacitance between said one pickoff plate and capacitive means and said other pickoff plate and said capacitive means.

8. The device recited in claim 6 wherein said means for detecting the difference in distance between said one pickoff plate and said capacitive means and said other pickoff plate and said capacitive means comprises a direct current source connected between said plates and said capacitive means and a phase-sensitive demodulator connected to receive the voltage outputs of said pickoff plates and said reference plate.

9. A capacitive pickoff device comprising at least two substantially oppositely oriented electrically conductive pickoff plates and one electrically conductive reference plate, a member having a plurality of equispaced teeth located proximate to said reference and pickoff plates, means for causing relative motion between said plates and said member to move said teeth successively past said plates at normally equal distances therefrom, said reference plate and one of said pickoff plates being positioned directly opposite one of said teeth when the other of said pickoff plates is positioned directly opposite a space between said teeth, and means for comparing the capacitance between said teeth and each of said plates.

10. A capacitive pickoff device comprising a first member, at least two electrically connected electrical pickoff plates fixedly mounted on substantially opposite sides of said first member and electrically insulated therefrom, a reference plate fixedly mounted on said member, a second member being electrically conductive located proximate to said pickoff and reference plates, means for causing relative motion between said first and said second members, said second member having a plurality of equispaced apertures, said reference plate and one of said pickoff plates being positioned directly opposite one of said apertures when the other of said pickoff plates is positioned directly opposite a space between said apertures, a direct current source connected between said plates and said second member and means for detecting the phase difference between the voltage output of said reference plate and said pickoff plates and the amplitude of the voltage output of said pickoff plates.

11. A capacitive pickoff device comprising a first member, at least two electrically connected electrical pickoff plates fixedly mounted on substantially opposite sides of said first member and electrically insulated therefrom, a reference plate fixedly mounted on said member, a second member located proximate to said pickoff and reference plates, means for causing relative motion between said first and said second members, said second member having a plurality of equispaced electrically conductive teeth, said reference plate and one of said pickoff plates being positioned directly opposite one of said teeth when the other of said pickoff plates is positioned directly opposite a space between said teeth, a direct current source connected between said plates and said teeth and means for detecting the phase difference between the voltage output of said reference plate and said pickoff plates and the amplitude of the voltage output of said pickoff plates.

12. A capacitive pickoff device comprising a first member, at least two electrically connected electrical pickoff plates fixedly mounted on substantially opposite sides of said first member and electrically insulated therefrom, a reference plate fixedly mounted on said member, a second member located proximate to said pickoff and reference plates and concentric with said first member, means for causing relative rotational motion between said first and said second members, said second member having a plurality of equispaced electrically conductive teeth, said reference plate and one of said pickoff plates being positioned directly opposite one of said teeth when the other of said pickoff plates is positioned directly opposite a space between said teeth, a direct current source connected between said plates and said teeth, and means for detecting the phase difference between the voltage output of said reference plate and said pickoff plates and the amplitude of the voltage output of said pickoff plates.

13. In a capacitive pickoff device, a first member having at least two oppositely oriented electrical pickoff plates and one electrical reference plate fixedly mounted thereon and electrically insulated therefrom, said pickoff plates being electrically connected to each other, a second member concentric with said first member, means for causing relative rotational motion between said first and said second members, said second member having an odd number of equispaced electrically conductive teeth, said reference plate and one of said pickoff plates being positioned directly opposite one of said teeth when the other of said pickoff plates is positioned directly opposite a space between said teeth, a direct current source connected between said plates and said teeth, and means for detecting the phase difference between the voltage output of said reference plate and said pickoff plates and the amplitude of the voltage output of said pickoff plates.

14. A capacitive pickoff for use with a gyroscope having concentric rotating and fixed members comprising at least two electrical pickoff plates fixedly mounted on opposite sides of one of said members, said plates being electrically insulated from said one member, at least one electrically conductive reference plate fixedly mounted on and electrically insulated from said one member, an odd number of equispaced electrically conductive teeth formed in said other of said members, said reference plate and one of said pickoff plates being positioned adjacent to and opposite one of said teeth when the other of said pickoff plates is positioned adjacent to and opposite a space between said teeth, means for rotating said rotating member, a direct current source connected between said plates and said teeth, and means for detecting the phase difference between the voltage outputs of said reference plate and said plates and the amplitude of the voltage output of said pickoff plates.

15. A capacitive pickoff for use with a gyroscope having concentric rotating and fixed members comprising at least two electrical pickoff plates fixedly mounted on opposite sides of said fixed member, said plates being electrically insulated from said member, at least one electrically conductive reference plate fixedly mounted on and electrically insulated from said fixed member, an odd number of equispaced electrically conductive teeth formed in said rotating member, said reference plate and one of said pickoff plates being positioned adjacent to and opposite one of said teeth when the other of said pickoff plates is positioned adjacent to and opposite a space between said teeth, means for rotating said rotating member, a direct current source connected between said plates and said teeth, and means for detecting the phase difference between the voltage outputs of said reference plate and said pickoff plates and the amplitude of the voltage output of said pickoff plates.

16. In a capacitive pickoff device, a first member having at least two oppositely oriented electrical pickoff plates and one electrical reference plate fixedly mounted thereon and electrically insulated therefrom, said pickoff plates being electrically connected to each other, a second electrically conductive member concentric with said first member, means for causing relative rotational motion between said first and said second members, said second member having an odd number of equispaced apertures, said reference plate and one of said pickoff plates being positioned directly opposite one of said apertures when the other of said pickoff plates is positioned directly opposite a space between said apertures, a direct current source connected between said plates and said second member, and means for detecting phase and amplitude difference between the voltage output of said reference plate and said pickoff plates.

17. A capacitive pickoff for use with a gyroscope having at least one rotating and one fixed concentric member, comprising at least two electrical pickoff plates fixedly mounted on opposite sides of said fixed member, said plates being electrically insulated from said member and having notches in the surfaces thereof adjacent said rotating member, at least one electrically conductive reference plate fixedly mounted on and electrically insulated from said fixed member, an odd number of equispaced electrically conductive teeth formed in said rotating member, said reference plate and the spaces between the notches in one of said pickoff plates being positioned adjacent to and opposite said teeth when the notches of the other of said pickoff plates are positioned adjacent to and opposite spaces between said teeth, means for rotating said rotating member, a direct current source connected between said plates and said teeth through a transformer winding, and means for detecting the phase difference between the voltage output of said reference plate and said pickoff plates and the amplitude of the voltage output of said pickoff plates.

18. In a capacitive pickoff device, a first member having at least two oppositely oriented electrical pickoff plates and one electrical reference plate fixedly mounted thereon and electrically insulated therefrom, said pickoff plates being electrically connected to each other, a second member concentric with said first member, means for causing relative rotational motion between said first and said second members, said second member having an odd number of equispaced equal width teeth, the spaces between said teeth being equal to the width of said teeth, the width of said teeth and spaces being substantially equal to the width of said pickoff plates, said reference plate and one of said pickoff plates being positioned directly opposite one of said teeth when the other of said pickoff plates is positioned directly opposite a space between said teeth, a direct current source connected between said plates and said teeth, and means for detecting the difference between the voltage output of said reference plate and said pickoff plates.

References Cited in the file of this patent
UNITED STATES PATENTS

| | | |
|---|---|---|
| 2,381,645 | Carlstein | Aug. 7, 1945 |
| 2,490,735 | Kliever | Dec. 6, 1949 |
| 2,805,677 | Baird | Sept. 10, 1957 |